United States Patent
Gansky et al.

(10) Patent No.: US 9,628,351 B2
(45) Date of Patent: Apr. 18, 2017

(54) SCALABLE VARIANT CONFIGURATION PLATFORM FOR ONLINE SYSTEMS

(71) Applicant: Microsoft Corporation, Redmond, WA (US)

(72) Inventors: Simon Gansky, Redmond, WA (US); Justin Melvin, Bellevue, WA (US); Ivan Laktyunkin, Bellevue, WA (US); Prasad Tammana, Kirkland, WA (US); Isidro Hegouaburu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 13/913,471

(22) Filed: Jun. 9, 2013

(65) Prior Publication Data
US 2014/0365625 A1 Dec. 11, 2014

(51) Int. Cl.
*G06F 15/177* (2006.01)
*H04L 12/24* (2006.01)

(52) U.S. Cl.
CPC ...... *H04L 41/5054* (2013.01); *H04L 41/0866* (2013.01)

(58) Field of Classification Search
CPC ............. H04L 41/0803; H04L 41/0816; H04L 41/0823; H04L 41/0876; H04L 41/0886
See application file for complete search history.

(56) References Cited

U.S. PATENT DOCUMENTS

| | | |
|---|---|---|
| 6,263,485 B1 | 7/2001 | Schofield |
| 6,934,709 B2 | 8/2005 | Tewksbary |
| 7,797,675 B1 | 9/2010 | Michel et al. |
| 8,255,485 B2 | 8/2012 | Martinez et al. |
| 2006/0026335 A1* | 2/2006 | Hodgson et al. ............ 711/1 |
| 2008/0216161 A1 | 9/2008 | Eibach et al. |

(Continued)

OTHER PUBLICATIONS

Heather, Kreger, "Web Services Conceptual Architecture (WSCA 1.0)", Retrieved at <<http://www.csd.uoc.gr/~hy565/newpage/docs/pdfs/papers/wsca.pdf>>, In IBM Software Group, May 2001, pp. 41.

(Continued)

*Primary Examiner* — Esther B Henderson
(74) *Attorney, Agent, or Firm* — The Watson IP Group, PLC; Vladan M. Vasiljevic (57) ABSTRACT

A scalable variant configuration platform separates, behind a defined interface, mechanisms for determining configurations based upon provided variants. Information regarding specific factors, or "variants" is provided and a configuration request object is generated through which services can be configured. A schema is utilized to generate an object model that can assign object-oriented properties, such as type information, to the various factors that can influence configuration. The schema is also utilized to generate a sample configuration file, which can aid in the generation of the configuration file that can specify how one or more factors can affect the configuration of the services. The generation of the configuration request object is based upon self-tuning algorithms that can adapt based upon the types of factors that will be utilized for the configuration of the services being provided.

18 Claims, 4 Drawing Sheets

(56) References Cited

U.S. PATENT DOCUMENTS

| | | | | |
|---|---|---|---|---|
| 2009/0113277 A1* | 4/2009 | Gibson | ............ | G06F 3/14 715/200 |
| 2013/0315138 A1* | 11/2013 | Bath | ............ | H04L 65/1016 370/328 |
| 2013/0346339 A1* | 12/2013 | Yao et al. | ............ | 705/348 |

OTHER PUBLICATIONS

Larsson, et al., "New Challenges for Configuration Management", Retrieved at <<http://www.idt.mdh.se/~icc/articles/1999-Toulouse/CMChallenges-submitted.pdf>>, In Proceedings of the 9th International Symposium on System Configuration Management, Sep. 5, 1999, pp. 12.

* cited by examiner

SCALABLE VARIANT CONFIGURATION PLATFORM FOR ONLINE SYSTEMS

BACKGROUND

The ever increasing availability of high-speed network connections has enabled the delivery of increasingly powerful computer-centric services over such high-speed network connections. Traditionally, personal computing devices utilized computer-executable instructions executing locally on such personal computing devices to perform tasks such as content creation, entertainment consumption, and other like tasks. Network communicational connections between such personal computing devices and other computing devices, such as through the ubiquitous Internet and World Wide Web, were often limited in their bandwidth and, consequently, were utilized primarily in conjunction with the consumption or dissemination of static information, such as browsing minimally interactive webpages or transmitting electronic mail messages that were composed locally on the personal computing devices. The ever increasing availability of high-speed network connections, however, has enabled personal computing devices to increasingly utilize remotely executing computer-executable instructions for tasks such as the aforementioned content creation and entertainment consumption tasks. For example, users can now access, through their personal computing devices, websites that offer users the ability to generate word processing documents, edit spreadsheets, create presentations, author email, engage in video teleconferencing, and perform other like tasks. The functionality and services offered by such websites are enabled in large part by computer-executable instructions executing remotely from the personal computing devices through which the users are accessing such websites.

As the functionality and services being made available over network communicational connections have increased in complexity, the need to configure such functionality and services has, likewise, increased. For example, a traditional, static webpage can be generated identically for a wide variety of users and computing devices and, as such, there is little need to configure such a webpage to output different content, or to change its presentational instructions. Conversely, more complex functions and services can be optimized for specific types of computing devices through which such functions and services are being consumed, specific geographic regions or markets within which such functions and services are being consumed, and numerous other such factors. For example, a network-based content creation service, such as a website offering word processing functionality, can provide a different interface depending on whether the user is accessing the service through a personal computing device having a limited display resolution, such as a laptop computing device with a small display, or whether the user is accessing the service through a personal computing device having a high resolution display, such as a desktop computing device connected to a large screen monitor. Similarly, such word processing functionality can be presented, by the website, differently to users that are utilizing one web browser application program than it is to users that are utilizing a different web browser application program that may comprise different capabilities.

Consequently, in order to determine which features and functionality should be provided to a user, and in what manner, a network-based user-facing service can first obtain information regarding various factors upon which such a determination would be based. Once such factors are known, determinations can be made as to which features and functionality, and in what manner, are to be provided. However, because such a determination is made within the context of a back-and-forth of network communications such determinations may need to be made very quickly. Unfortunately, however, as the number of factors upon which such determinations are based increases, both in dimensionality and in possible values, the quantity of different combinations of such factors increases at an exponential rate. Consequently, traditional mechanisms for evaluating such factors and making determinations based upon them can become increasingly bloated, resulting in extended delays when the service is restarted.

In addition, traditionally, the computer-executable instructions for evaluating factors and then determining which features and functionality are to be presented based on such factors, are typically incorporated with the computer-executable instructions providing such features and functionality in the first place. Consequently, even a simple change, such as a change to provide a specific feature to a group of users that were previously excluded from receiving such a feature, can result in a re-instantiation of the entire service providing codebase. Errors can also be more difficult to identify among the computer-executable instructions that evaluate the various factors because such factors do not included the sort of structure that provides for inherent error correction. For example, the factors are typically not defined in terms of objects that are strongly typed. Consequently, minor errors, such as a type mismatch, can result in sub optimal performance that could otherwise have been easily avoided.

SUMMARY

In one embodiment, mechanisms are provided by which an interface can be established between the computer-executable instructions providing services, such as those being provided over a network, and the mechanisms that configure such services. A variant configuration system can receive information regarding specific factors, or "variants", and can generate a configuration request object through which the computer-executable instructions providing services can be configured. Such an interface can separate the mechanisms utilized to configure services from the computer-executable instructions that provide such services, enabling the computer-executable instructions that provide such services to be unaffected by updates to the configuration settings. Additionally, updates to the configuration settings can be performed on an incremental basis, resulting in updates that can be orders of magnitude faster in situations utilizing highly multi-variant configuration settings.

In another embodiment, a schema can be utilized to generate an object model that can assign object-oriented properties, such as type information, to the various factors that can influence configuration of services. Traditional object-oriented error detection and correction mechanisms can then be utilized to reduce errors.

In a further embodiment, the generation of a configuration request object, through which the provision of services can be configured, can be based upon self-tuning algorithms that can adapt based upon the types of factors that will be utilized for the configuration of the services being provided. Such self-tuning algorithms can include the capability of utilizing different algorithms to evaluate different subsets of factors and can include the capability of selecting algorithms to limit memory consumption at the cost of decreased valuation speed.

In a still further embodiment, a schema can be utilized to generate a sample configuration file, which can aid in the generation of the configuration file that can specify how one or more factors can affect the configuration of the services being provided. Such a sample configuration file can act as a template for the generation of the configuration file that will ultimately be utilized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for implementing a scalable variant configuration platform that can separate, behind a defined interface, mechanisms for determining configurations based upon provided variants. Information regarding specific factors, or "variants" can be provided to the variant configuration system and a configuration request object can be generated through which services can be configured. By separating the mechanisms utilized to configure services from the computer-executable instructions that provide such services, the latter can be unaffected by changes to configuration settings. Additionally, updates to configuration settings can be performed on an incremental basis. A schema can be utilized to generate an object model that can assign object-oriented properties, such as type information, to the various factors that can influence configuration. The schema can also be utilized to generate a sample configuration file, which can aid in the generation of the configuration file that can specify how one or more factors can affect the configuration of the services. The generation of the configuration request object can be based upon self-tuning algorithms that can adapt based upon the types of factors that will be utilized for the configuration of the services being provided. Such self-tuning algorithms can include the capability of utilizing different algorithms to evaluate different subsets of factors and can include the capability of selecting algorithms to limit memory consumption at the cost of decreased valuation speed.

Although not required, the description below will be in the general context of computer-executable instructions, such as program modules, being executed by one or more computing devices. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 1:
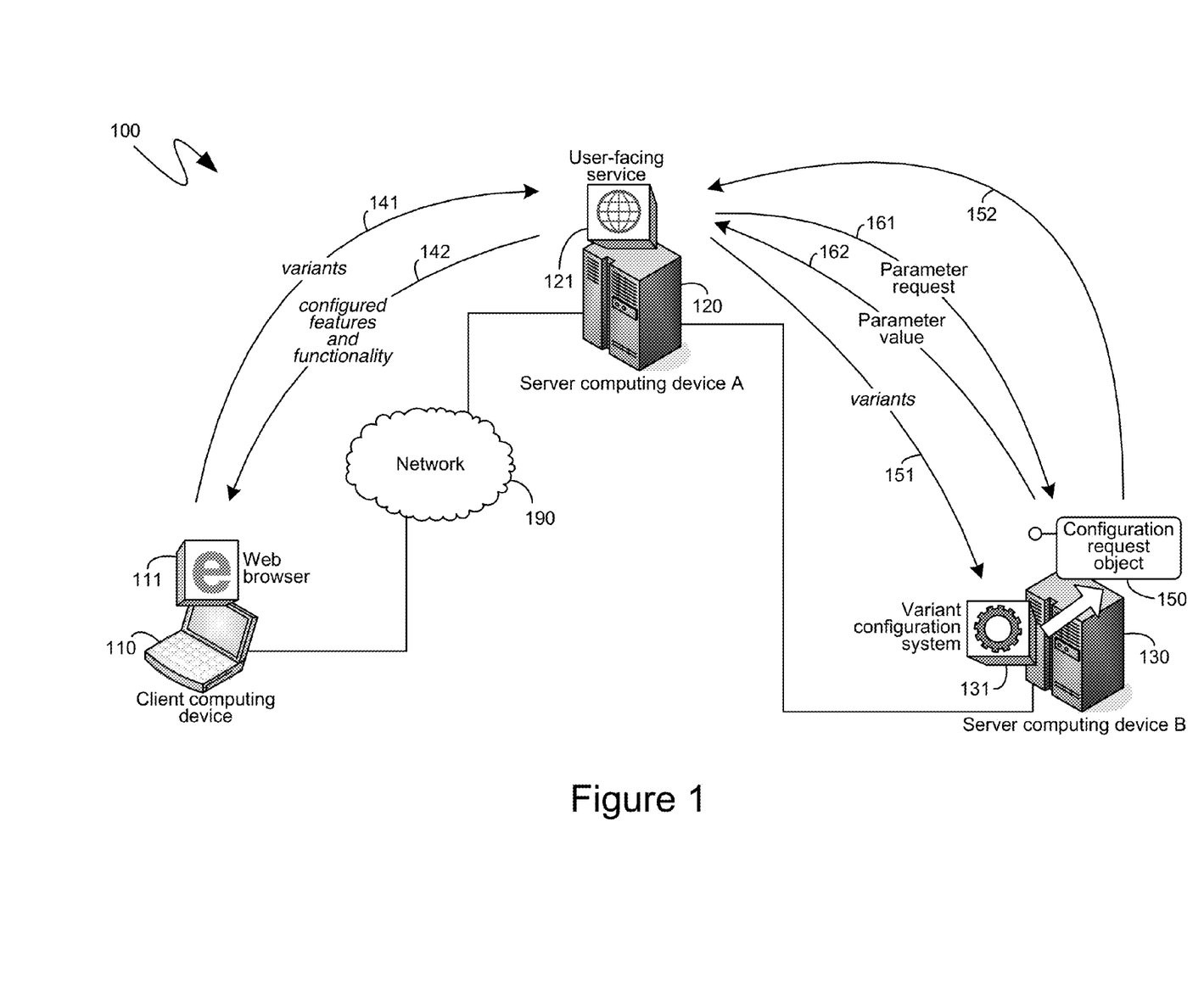
FIG. 1 is a block diagram illustrating an exemplary system implementing a scalable variant configuration platform.

With reference to FIG. 1, an exemplary system 100 is illustrated, providing context for the descriptions below. Exemplary system 100 can be in the context of services being provided over a network, such as the network 190, by a user-facing service 121. The user-facing service 121 can, in one embodiment, be accessed by an appropriate network browser application program, such as the ubiquitous web browser 111, that can execute on a client computing device, such as the client computing device 110. For example, the user-facing service 121 can be a website that can provide word processing functionality to users over the network 190, where such users can utilize a web browser, such as the web browser 111, executing on their own computing devices, such as the client computing device 110, to perform word processing and other like document creation without needing to purchase and install a word processing application program that would execute locally on their own computing devices. As another example, the user-facing service 121 can be a website that can provide enterprise content and document management where, again, users can utilize a web browser, such as the web browser 111, executing on their own computing devices, such as the client computing device 110, to access such a content and document management service, thereby enabling the users to perform enterprise-based tasks without requiring increased information technology infrastructure to maintain dedicated computer-executable instructions executing on each individual client computing device.

While the above examples have been within the context of the network 190 being the ubiquitous World Wide Web, such examples are meant to be illustrative only, as the mechanisms described are equally applicable to other types of networking environments. Nevertheless, for ease of presentation and reference, descriptions below will, likewise, be provided within the context of services being provided over the ubiquitous World Wide Web.

As will be recognized by those skilled in the art, services that are provided over a network to multiple different users can be configured differently for different ones of those users. For example, services may take advantage of capabilities of browser application programs that can differ among different types of browser application programs, or among the browser application programs executing on different types of operating systems. In such an example, consequently, such a service would need to have some mechanism for differentiating between those different types of browser application programs so that it only takes advantage of capabilities that the browser application program actually possesses. More specifically, such a service could configure itself so as to provide one set of functionality to users utilizing browser application programs having certain capabilities, and another, different set of functionality to users utilizing browser application programs lacking those capabilities. As another example, services that are provided to many different users, such as over a network, can take advantage of the breadth and scope of their users to test experimental functionality on only a small subset of users, thereby obtaining meaningful test data without significantly impacting the operation of the overall service as perceived by the entire set of its users. For example, such a service can provide experimental functionality to one out of every thousand users accessing the service. If the experimental functionality results in a failure, or in sub-optimal performance, the user to whom such experimental functionality was provided need only terminate their current session with the service and initiate a new session, and the chances of such a new session also including experimental functionality, and, thereby, also resulting in the failure or suboptimal performance, would be less than one tenth of one percent.

The factors upon which a service can base its configuration are commonly referred to as "variants" and can include information that can be obtained from a user of the service such as, the location or network from which the user is accessing the service, the type of browser the user is utilizing to access the service, the type of client computing device on which such a browser is executing, the preceding network destination from which the user was directed to the service, and other like information. As illustrated by the system 100 of FIG. 1, such variants can be obtained by the user-facing service 121 from, at least in part, the browser application 111. In the particular exemplary system 100 shown in FIG. 1, the user-facing service 121 is illustrated as executing on a server computing device 120 that can be communicationally coupled to the client computing device 110 via a network 190. Such an illustration is, however, strictly exemplary and is provided for ease of illustrative presentation. Instead, as will be recognized by those skilled in the art, the user facing service 121 will likely be executed across multiple different server computing devices, such as those that would traditionally be found in a data center that can host such a service.

As illustrated, at least some variants can be obtained by the service 121 from the browser 111 via the communication 141. Generally, in response, the service 121 can via communications with the browser 111, provide a user of the browser 111 with features and functionality that have been configured based upon variants, including the variants received via the communication 141. In a general sense, such a provision of configured features and functionality is illustrated by the communication 142 though, as will be recognized by those skilled in the art, utilization of the service 121 by a user via the browser 111 will entail an ongoing sequence of communications between the web browser 111 and the service 121.

In one embodiment, to configure the features and functionality of the service 121, the service can provide the variants that it has acquired, including the variants received via the communication 141, to an independent variant configuration system, such as the variant configuration system 131, as illustrated by the communication 151. In response, the variant configuration system 131 can generate a configuration request object 150 that can be identified to the service 121 via the communication 152. As will be described in further detail below, the configuration request object 150 can be generated in accordance with configuration settings that can be provided by the service 121 and that can define how various configurations of the service 121 can be altered depending upon the variants obtained by the service 121.

Once generated, the configuration request object 150 can define an interface that the service 121 can utilize to obtain parameter values identifying the configuration that the service 121 is to take. Thus, as illustrated by the system 100 of FIG. 1, once the configuration request object 150 is identified to the service 121, via the communication 152, the computer-executable instructions that enable the service 121 can issue parameter requests, such as the exemplary parameter request 161, on the configuration request object 150 and can receive, in response, parameter values, such as exemplary parameter value 162, that can enable those computer-executable instructions to configure the service 121 in accordance with the service's configuration settings. As one simple example, the service 121 can be configurable to provide a red background if it is accessed by a user accessing the service 121 through an internal corporate network and a green background if it is accessed by user accessing the service 121 through an external network, such as the Internet. An identification of the network from which a user is accessing the service 121 can be one of the variants received via the communication 141, and provided to the variant configuration system 131 via the configuration 151. In response, the variant configuration system 131 can generate a configuration request object 150 that can comprise a color parameter, identifying a color of a background that is to be presented to users by the service 121. The service 121 can then access such a parameter via the parameter request 161, and can receive, in response, a color identifying value 162. For example, if the variants provided via the communication 151 indicate that the service 121 is being accessed by a user from an internal corporate network, the configuration request object 150 can comprise a color parameter whose value can be "red". A request 161 for such a parameter, such as by computer-executable instructions providing the service 121 can return a value 162 of "red". Such a value can then be utilized by the computer executable instructions providing the service 121 to provide a background of the identified color, namely a red background in this simplified example.

The configuration request object 150 can comprise parameters that are in accordance with configuration specifications previously provided to the variant configuration system 131 by the service 121. For example, in the above simplified example, the configuration specifications provided by the service 121 can cause the variant configuration system 131 to generate a configuration request object 150 that comprises a "color" parameter whose values can be textual strings, or numerical values, identifying specific colors. By defining the parameters of the configuration request object 150, via configuration specifications, the service 121 can define an interface by which it can access configuration settings. Such an interface can separate the service 121 from the mechanisms utilized to determine its configuration, such as the variant configuration system 131 shown in the system 100 of FIG. 1.

By separating the service 121 from the mechanisms utilized to determine which configuration of the service 121 should be presented to any one client, myriad of advantages can be realized, including the ability to update configuration specifications without negatively impacting the operation of the service 121, the ability to update configuration specifications on an incremental basis, thereby increasing the efficiency with which such an update occurs, the ability to implement type information and other error-detecting mechanisms, the ability to tune the manner in which configuration settings are determined, and other like advantages. To graphically illustrate the separation between the computer-executable instructions providing a service, such as the service 121, and the mechanisms determining configuration settings, such as those of the variant configuration system 131, the system 100 of FIG. 1 illustrates the variant configuration system 131 as executing on a server computing device 130 that is different from the server computing device 120 on which the service 121 executes. Again, such an embodiment is strictly exemplary, and such a distinction is made strictly for illustrative purposes. Instead, as will be recognized by those skilled in the art, the variant configuration system 131, like the service 121, can be distributed across, and executed across, one or more server computing devices, typically in a data center, which can include some or all of the server computing devices that are also executing the service 121.

Figure 2:
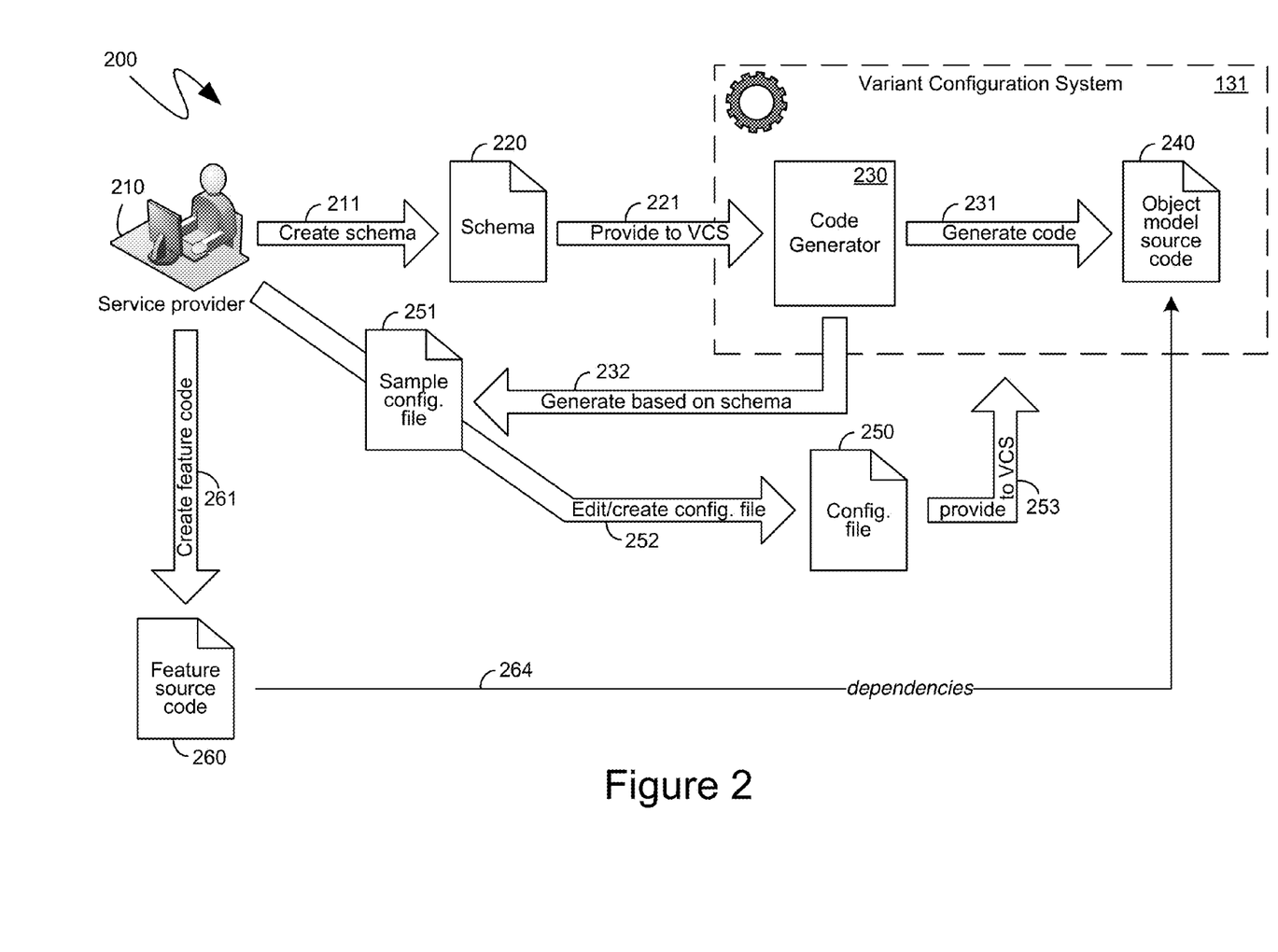
FIG. 2 is a block diagram illustrating an exemplary system for defining an interface to be provided by a scalable variant configuration platform.

Turning to FIG. 2, the system 200 shown therein illustrates an exemplary manner in which the variant configuration system 131 can be provided with the configuration specification, identifying specific configuration settings, and how such settings are to be established based upon one or more variants. The service provider 210 can represent a decision-making or controlling entity that provides the service 121 shown in the system 100 of FIG. 1. For example, the service provider 210 can be one or more programmers or developers that generate the programming that implements the service 121. In one embodiment, as illustrated by the system 200 of FIG. 2, the service provider 210 can create a schema 220, as illustrated by the action 211. Such a schema can define a syntax and structure with which the configuration settings can be determined and by which a configuration specification can specify how such configuration settings are to be determined based upon the value of one or more variants. More specifically, the schema 220 can define various classes, objects, variables, types and other like information that can establish a structure that will be utilized to provide configuration specifications defining how configuration settings are to be determined and established based upon the value of one or more variants. As such, in effect, the schema 220 can define the interface between the service and the configuration mechanisms; an interface that can be utilized by the computer-executable instructions that comprise the service 121 to obtain configuration settings and, thereby, configure the service 121.

The schema 220 can be created utilizing any appropriate definitional language or structure. For example, the schema 220 can be created in accordance with the eXtensible Markup Language (XML). As another example, the schema 220 can be created in accordance with definitional languages and structures that are already utilized in conjunction with the establishment of configuration settings. To provide a concrete illustration of the content of a schema, such as exemplary schema 220, a simple example is provided in Table 1, below.

TABLE 1

Sample Configuration Schema

```
struct Feature
{
   string Title;
   string Color;
   Dimension Size;
   list<Resource> Resources;
};
struct Dimension
{
   int32 Height;
   int32 Width;
};
struct Resource
{
   string Type;
   string Name;
   string Path;
};
```

As can be seen, various data types can be defined. For example, a structure of the "Feature" data type can comprise a variable called "Title" whose data value can be a string of alphanumeric characters, a variable called "Color" whose data can also be a string of alphanumeric characters, a variable called "Size" whose data can conform to the "Dimension" data type, and a variable called "Resources" whose data can be a list of individual collections of data, where each collection can conform to the "Resource" data type. The "Dimension" data type and the "Resource" data type can then be further defined. For example, a structure of the "Dimension" data type can comprise two variables, one named "Height", and the other named "Width", both of which can be of the 32-bit integer type. Similarly, a structure of the "Resource" data type can comprise three variables, one named "Type", the second named "Name", and the third named "Path", each of which can be a string of alphanumeric characters.

By defining a syntax, such as that defined in the exemplary schema of Table 1, above, a service provider 210 can establish the structure by which it can provide configuration specifications that can specify how configurations are to be set based upon the values of one or more variants. In one embodiment, aspects of the variant configuration system 131 can aid the service provider 210 in the generation of a configuration file that can provide the specifications of how configurations are to be set based on the values of one or more variants. More specifically, and as illustrated by the system 200 of FIG. 2, the schema 220 can be provided to the variant configuration system 131, as illustrated by the action 221. As part of the variant configuration system 131, a code generator 230 can utilize the schema 220 to both generate an object model source code 240, as illustrated by the action 231, and to generate a sample configuration file 251, such as is illustrated by the action 232.

Turning first to the generation 232 of the sample configuration file 251, such a sample configuration file 251 can be provided to the service provider 210 to aid the service provider 210 in generating the configuration file 250. More specifically, it can be easier, more efficient, and less prone to error, to generate the configuration file 250 from the sample configuration file 251. With reference again to Table 1, above, the code generator 230 can, upon receiving a schema 220 such as that illustrated in Table 1, generate a sample configuration file 251 that can, for example, include at least one instance of a "Feature" data type, at least one instance of a "Dimension" data type and at least one instance of a "Resource" data type. In each case, the exemplary instances can include each of the components of such structures. For example, the sample configuration file 251 generated from the exemplary schema of Table 1, can include an exemplary instance of the "Feature" data type that can include exemplary instances of a "Title" variable, a "Color" variable, a "Dimension" data structure and a "Resource" structure. Similarly, such a sample configuration file can also include an exemplary instance of the "Dimension" data structure that can include exemplary instances of the "Width" and "Height" variables, and at least one exemplary instance of the "Resource" data structure that can include exemplary instances of the "Type", "Name", and "Path" variables.

With such a sample configuration file 251, the service provider 210 can simply edit the structures already enumerated in the sample configuration file 251 in order to create a configuration file 250 that can be utilized to configure the service in accordance with one or more variants in a defined manner. More specifically, the configuration file 250 can include defined instances of the various data types and structures defined in the schema 220, together with conditional specifications defining the conditions, such as the values of one or more variants, under which such data types and structures are to be utilized for configuration purposes. For example, and with reference to exemplary schema of Table 1, there can be defined, such as in the configuration file 250, two instances of the "Dimension" data structure: a first instance that can be named "Mobile Dimension" and that can comprise "Width" and "Height" variables having values of 640 and 480, respectively, and a second instance that can be named "Desktop Dimension" and that can comprise "Width" and "Height" variables having values of 1920 and 1080, respectively. In such an example, the configuration file 250 can further comprise conditional specifications that can, for example, specify the data structure named "Mobile Dimension" if a browser type variant comprises a value indicative of a browser being executed on a mobile computing device, and that can specify the data structure named "Desktop Dimension" if a browser type variant comprises a value indicative of a browser being executed on a desktop computing device. The creation of such a configuration file 250, including from a sample configuration file 251, is illustrated by the action 252 shown in the system 200 of FIG. 2. Once such a configuration file 250 is created, such as by the service provider 210, it can be provided to the variant configuration system 131, as illustrated by the action 253, shown in FIG. 2.

In addition to editing a sample configuration file 251, or otherwise creating the configuration file 250, and providing it to the variant configuration system 131, the service provider 210 can also create the feature source code 260, as illustrated by the action 261, that can implement the service being provided by the service provider 210 and which can be configured in accordance with the specification of the configuration file 250. For example, the feature source code 260 can comprise source code for the displaying of some information to a user within the display area whose dimensions can be configured based upon one or more variants, such as, for example, the browser type variant referenced above. In such an example, the feature source code 260 can comprise dependencies 264 on the object model source code 240 generated by the code generator 230, such as in the manner described in detail below. More specifically, the feature source code 260 can comprise instructions for obtaining configuration settings, such as the dimensions of a display area, by reference to a configuration request object, such as the configuration request object 150 shown in FIG. 1, where the configuration request object provides configuration settings in accordance with the data structures defined by the schema 220.

For example, returning to the above example of two different instances of the "Dimension" data structure, the variant configuration system 131 can generate a configuration request object, such as the configuration request object 150 shown in FIG. 1, that can include an identification of either the data structure named "Mobile Dimension" or the data structure named "Desktop Dimension" depending upon the variants received by the variant configuration system 131, and depending upon the specifications of how such configurations are to be set depending on the variants that can be specified by the configuration file 250. The feature source code 260 can access the configuration request object and can receive one of the data structure named "Mobile Dimension" or the data structure named "Desktop Dimension", as the configuration setting to be utilized. Because of the dependencies 264 on the object model source code 240, the feature source code 260 can be aware of the structure of such data structures and, consequently, can avoid errors such as type mismatches. For example, the feature source code 260 can be aware that the "Dimension" data structures comprise variables whose values are 32-bit integers and, consequently, when consuming such values, the feature source code 260 should treat such values as 32-bit integers and not, for example, as an alphanumeric string.

In one embodiment, the compilation of the feature source code 260, with the dependencies 264 to the object model source code 240, can detect incorrect type utilization in the feature source code 260. Analogously, when the variant configuration system 131 loads the configuration file 250, the setting of a value, as a configuration setting, in accordance with the configuration file 250, can detect violations of data types. Other validations, beyond merely a validation of the correctness of data types, can also be performed. In one embodiment, a schema, such as the schema 220, can specify, not only data types, but also custom validation instructions that can validate one or more parameters. For example, in the exemplary schema shown in Table 1, above, custom validation instructions could specify that, not only are the "Height" and "Width" variables of the "Dimension" structure to be of an integer type, but that they should be non-zero positive integer values. Similarly, as another example, again with reference to the exemplary schema shown in Table 1, above, custom validation instructions could specify that the variable "Color", which is defined as a string, is one of a list of specific strings, such as "Red", "Blue", "Green" and the like, to avoid color values whose name is not recognized, or is a product of a typographical error.

Turning to the object model source code 240, such object model source code can be generated by the code generator 230 from the schema 220, as illustrated by the action 231 shown in the system 200 of FIG. 2. The object model source code 240 can, in one embodiment, comprise the source code for establishing and generating objects and data structures of the type defined in the schema 220. For example, and with reference to exemplary schema of Table 1, the object model source code 240 can comprise code for creating an object of the type "Feature" which can have dependencies on an object of the type "Dimension" and one or more objects of the type "Resources". Additionally, an object of the type "Feature" can comprise properties in the form of the aforementioned "Color" and "Title" variables, which, as indicated by Table 1, can be in the form of alphanumeric strings. Similarly, the object model source code 240 can comprise code for creating an object of the type "Dimension" that can comprise properties in the form of the "Height" and "Width" variables, which can be in the form of 32-bit integers, and code for creating an object of the type "Resource" that can comprise properties in the form of the "Name", "Path" and "Type" variables, which can be in the form of alphanumeric strings. With such object model source code 240, the variant configuration system 131 can create objects of the type defined in the schema 220, in accordance with the configuration file 250, the selected ones of which can be provided to the feature source code 260, in the form of a configuration request object, as the configuration settings to be utilized by the feature source code 260 to configure the service being provided.

Figure 3:
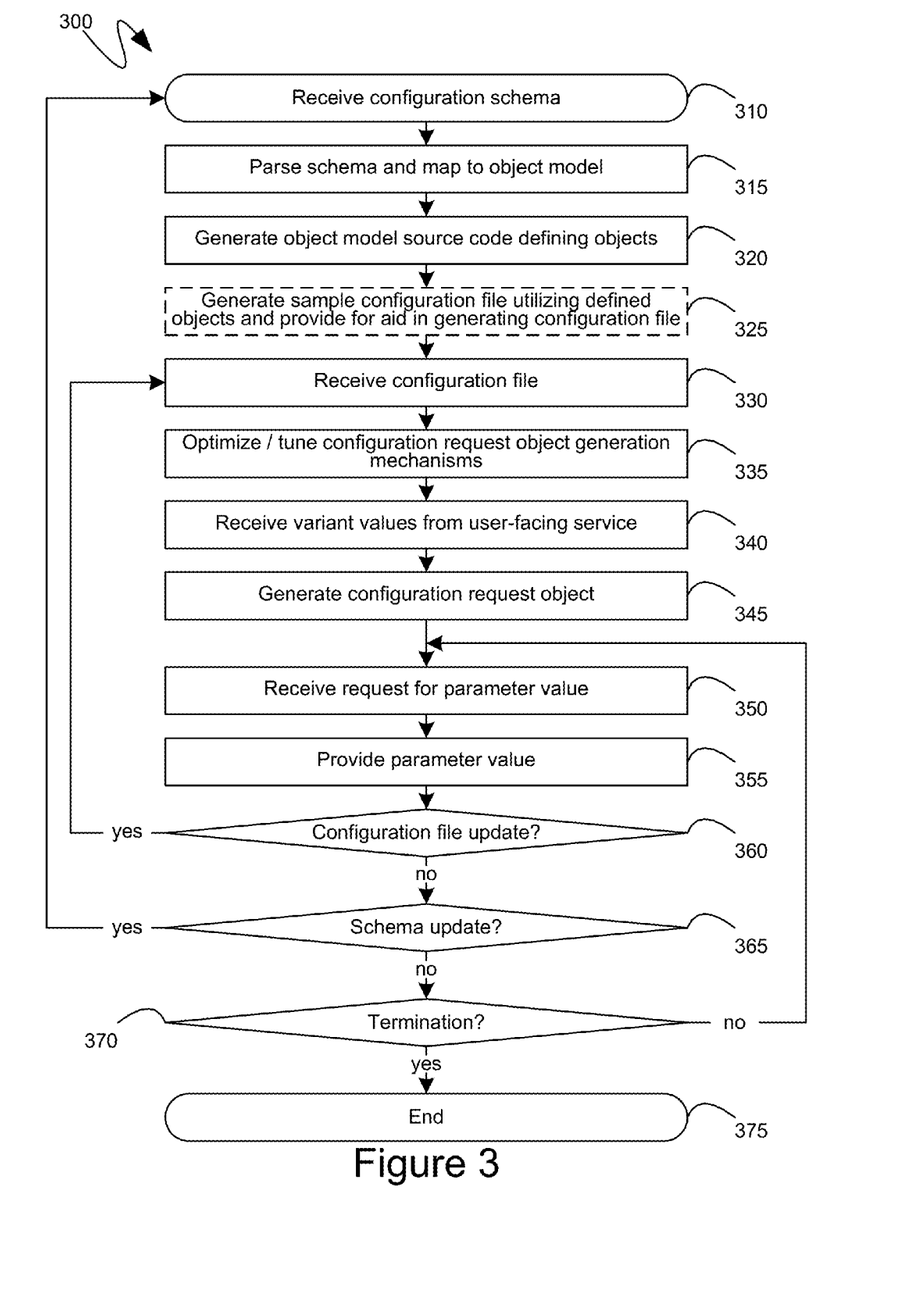
FIG. 3 is a flow diagram of an exemplary operation of a scalable variant configuration platform.

Turning to FIG. 3, the flow diagram 300 shown therein illustrates an exemplary series of steps that can be performed by a variant configuration system, such as the variant configuration system described in detail above. Initially, as illustrated, at step 310, a configuration schema can be received, such as the exemplary configuration schema enumerated in Table 1, above. Subsequently, at step 315, upon receipt of such a schema, at step 310, variant configuration system can proceed to parse the schema and map the structures defined therein to an object model. At step 320, object model source code can be generated, defining objects in accordance with the schema that was received at step 310. In addition to generating the object model source code, a sample configuration file can be generated at step 325 that can provide aid in generating a configuration file. More specifically, and as described in detail above, the sample configuration file generated at step 325 can include sample instances of each of the data structures defined in the schema that was received in step 310, thereby enabling a user to simply change aspects of such data structures, such as their name, and the values of specific ones of the variables in order to generate at least a portion of the configuration file.

Whether or not the sample configuration file is utilized in generating the configuration file, or, indeed, one of the sample configuration file is even generated, a configuration file can be received at step 330. To illustrate that the generation of the sample configuration file can be an optional step, step 325 is illustrated in dashed lines in the exemplary flow diagram 300 of FIG. 3. Once the configuration file is received at step 330, processing can proceed to step 335, at which point the mechanisms utilized to generate a configuration request object can be optimized. More specifically, in one embodiment, as part of step 335, an inspection of the schema received at step 310 and of the configuration file received at step 330 can be undertaken to determine optimal mechanisms by which generation of the configuration request object can be optimized. For example, if the schema received at step 310 and the configuration file received at step 330 indicate that configuration is to be performed based on a series of variants, each of which can be one of only a handful of possible values, a simple combinatorial cube can be constructed to account for the various different permutations and combinations of variant values. As will be recognized by those skilled in the art, such a combinatorial cube can provide an efficient mechanism by which a resulting set of configuration settings can be determined based upon a received set of variant values. As another alternative, if configuration settings are to be based upon a series of variants, at least one of which can be any one of the large number of different values, such a dimension having a large number of possible different values can be set aside, and a combinatorial cube can be materialized for the remaining dimensions to provide for fast lookup. Once such a lookup has been performed with respect to the variant values of the dimensions whose variants can be one of only a handful of possible values, the dimension having a large number of possible values can then be referenced and resolved.

In other embodiments, the optimization performed at step 335 can include a selection of one or more known algorithms or strategies for resolving combinatorial "if . . . then" statements, whereby the selection of such algorithms can include a trade-off between the speed with which such resolutions can be made as balanced by the consumption of computing resources, such as memory resources. For example, up to a defined memory threshold, algorithms that can provide for the fastest resolution can be selected. Beyond such a memory threshold, where such fastest algorithms would result in the consumption of a greater amount of memory beyond such a threshold, alternative algorithms can be implemented that can result in reduced resolution time, but with the benefit of a reduced memory footprint.

Once such an optimization has been performed, processing can proceed to step 340 where the values of one or more of the variants can be received, such as from the user facing service that is to be configured based upon the values of such variants. Subsequently, at step 345, the configuration request object can be generated based upon the values received at step 340, as well as the configuration file received at step 330 and the schema received at step 310. In one embodiment, the configuration request object generated at step 345 can comprise the configuration settings that have been determined based upon the variant values received at step 340, as well as the relationship between such variant values and resulting configuration settings, as specified in the configuration file received at step 330. Furthermore, the configuration request object, generated at step 345, can comprise data structures in accordance with the schema received at step 310. As indicated in the system 100 of FIG. 1, such a configuration request object can then be made available to the computer-executable instructions providing the user-facing service that is being configured.

Such computer executable instructions can then access the configuration request object, generated at step 345, in order to receive values of one or more parameters defining the configuration settings that such computer-executable instructions are to implement. More specifically, at step 350, a request for one or more parameter values can be received via one or more interfaces exposed by the configuration request object that was generated at step 345. In response, at step 355, the requested parameter value can be provided, thereby enabling the service to configure itself accordingly.

As indicated previously, in one embodiment, one benefit for separating configuration determining mechanisms from the mechanisms implementing the service to be configured can be that one or more updates can be performed changing the manner in which configurations are determined without negatively impacting the service being provided. Thus, for example, if an updated configuration file is received, processing can simply return to step 330, as illustrated by the step 360. As will be recognized by those skilled in the art, step 360 need not comprise an explicit check for an updated configuration file, but rather can simply represent an alternative execution path should such an updated configuration file be provided. Similarly, if an updated schema is provided, then, as illustrated by step 365, processing can return to step 310. As part of the return to step 310, step 315 can be performed a subsequent time, as illustrated. Thus, should a modified schema be updated, a rebuilding of the object model source code can occur as part of the re-performance of step 320. Again, as with step 360, step 365 need not comprise an explicit check for an updated schema, but rather can simply represent an alternative execution path. If no such updates are provided, than processing can simply repeat execution of steps 350 and 355, as needed, unless a termination condition is encountered, such as a termination of the service, or other like termination condition. In such an instance, as represented by step 370, processing can end at step 375.

In one embodiment, at step 360, updates to the configuration file can be transactionally performed. For example, an update to the configuration file, such as can be detected at step 360, can result in the re-performance of steps 335 through 345 where only portions of the structures previously generated during a prior performance of steps 335 through 345 are modified. In such an embodiment, configuration file updates can be performed more quickly, as only the changed portions need be processed. In a further embodiment, one or more configurations can be grouped together such that a reloading of any one or more of such configurations can result in a reloading of all the configurations in such a group.

Additionally, for simplicity of illustration, and to provide context, flow diagram 300 includes steps that can be performed "offline", such as prior to the commencement of interactions between a user and a user-facing service utilizing the configuration mechanisms described herein, and also includes steps that can be performed "online", namely as part of an interaction between a user and a user-facing service utilizing these configuration mechanisms. More specifically, steps 310 through 325, and, optionally, depending on implementation, step 625, can be performed offline. As such, those steps can be performed without regard to a time taken to perform such steps, because the time taken to perform such steps need not impact the user, or affect the user's perception of the responsiveness of the user-facing service. By contrast, the other steps can be performed online and, as such, can be optimized to reduce query time. In such a manner, those other steps can be performed so as to minimize any delay in the user experience that may be introduced by the configuration system described herein.

Figure 4:
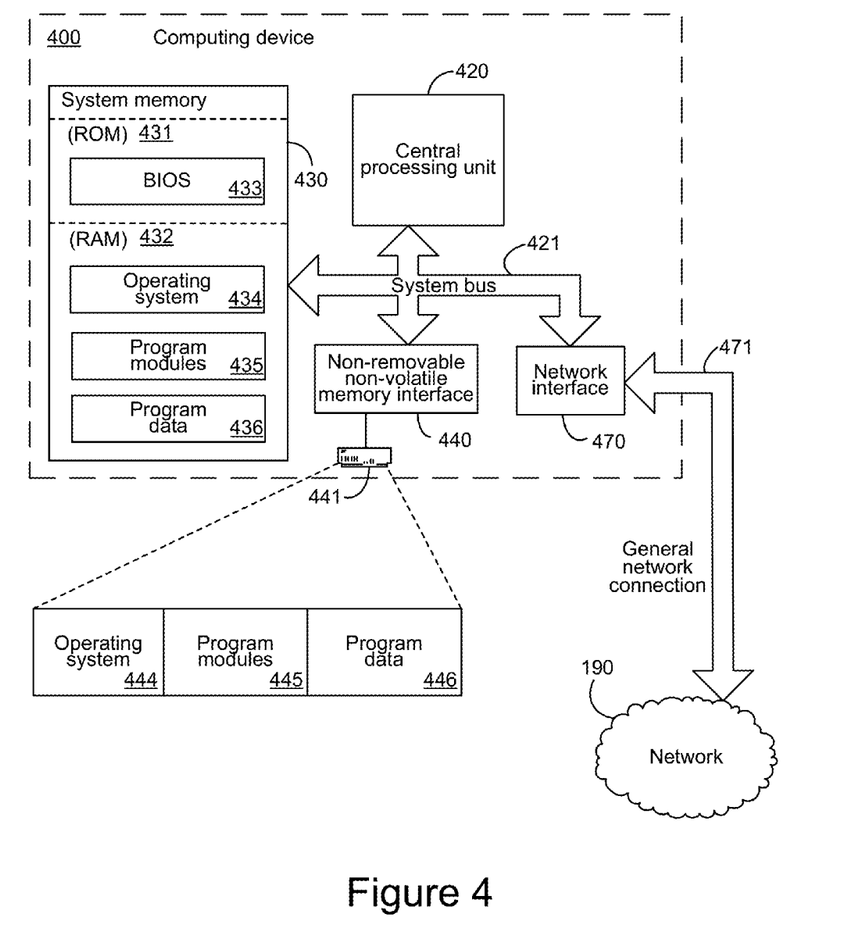
FIG. 4 is a block diagram of an exemplary computing device.

Turning to FIG. 4, an exemplary computing device 400 is illustrated, comprising, in part, hardware elements that can be utilized in performing and implementing the above described mechanisms. The exemplary computing device 400 can include, but is not limited to, one or more central processing units (CPUs) 420, a system memory 430 and a system bus 421 that couples various system components including the system memory to the processing unit 420. The system bus 421 may be any of several types of bus structures including a memory bus or memory controller, a peripheral bus, and a local bus using any of a variety of bus architectures. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 400 may operate in a networked environment via logical connections to one or more remote computers. The logical connection depicted in FIG. 4 is a general network connection 471 to the network 190 described previously. The network 190 to which the exemplary computing device 400 is communicationally coupled can be a local area network (LAN), a wide area network (WAN) such as the Internet, or other networks. The computing device 400 is connected to the general network connection 471 through a network interface or adapter 470, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

Among computer storage media, the system memory 430 comprises computer storage media in the form of volatile and/or nonvolatile memory, including Read Only Memory (ROM) 431 and Random Access Memory (RAM) 432. A Basic Input/Output System 433 (BIOS), containing, among other things, code for booting the computing device 400, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. These components can either be the same as or different from operating system 434, other program modules 435 and program data 436. Operating system 444, other program modules 445 and program data 446 are given different numbers here to illustrate that, at a minimum, they are different copies.

As can be seen from the above descriptions, a multi-tier scheduling mechanism that can be scaled to accommodate scheduling across thousands of computing devices has been presented. In view of the many possible variations of the subject matter described herein, we claim as our invention all such embodiments as may come within the scope of the following claims and equivalents thereto.

We claim:

1. A method of providing configuration settings, the method comprising the steps of:
   receiving a schema comprising programmatic definitions of computer-readable data structures;
   receiving a configuration file comprising conditional statements correlating configuration settings to values of variants;
   receiving values for at least some of the variants;
   comparing the received variant values to the variant values specified by the conditional statements of the configuration file;
   generating, based on the comparing, one or more of the configuration settings; and
   generating a configuration request object, comprising at least some of the generated configuration settings, the generating being performed by mechanisms that were tuned based on the received configuration file, the tuning comprising setting aside a first set of variants having a greater quantity of valid values than others of the variants; and materializing valid values for only the others of the variants;
   wherein at least some of the received variant values are indicative of capabilities of a computing device through which a user accesses a user-facing service;
   wherein at least some of the generated configuration settings define features of a user interface presented to the user by the user-facing service; and
   wherein the generated configuration settings comprise instances of the data structures defined in the schema.

2. The method of claim 1, further comprising the steps of: generating object model source code defining objects in accordance with the data structures defined in the schema; wherein computer-executable instructions of the user-facing service comprise dependencies on the generated object model source code.

3. The method of claim 1, further comprising the steps of: providing access to the configuration request object to the user-facing service; receiving, from the user-facing service parameter requests directed to the configuration request object and providing, in response to the parameter requests, parameter values specified by the configuration request object, the parameter values configuring the user-facing service.

4. The method of claim 1, further comprising the steps of: generating a sample configuration file comprising a sample instance of the data structures defined in the schema; and providing the sample configuration file to aid in generating the received configuration file.

5. The method of claim 1, wherein the data structures defined in the schema comprise variables of defined types, the method further comprising the steps of: loading the received configuration file prior to the generating the configuration request object, the loading of the received configuration file comprising detecting a setting of values that violates the defined types.

6. The method of claim 1, wherein the data structures defined in the schema comprise custom validation instructions, the method further comprising the steps of: loading the received configuration file prior to the generating the configuration request object, the loading of the received configuration file comprising validating a setting of values in accordance with the validation instructions.

7. The method of claim 1, further comprising the steps of: tuning, based on the received configuration file, mechanisms which perform the generating the configuration request object, the tuning comprising selecting slower mechanisms that consume less memory if faster mechanisms would consume a greater than a threshold amount of memory.

8. A computing device comprising:
   one or more processing units; and
   one or more computer-readable media comprising computer-executable instructions, which, when executed by the one or more processing units, cause the computing device to:
      receive a schema comprising programmatic definitions of computer-readable data structures;
      receive a configuration file comprising conditional statements correlating configuration settings to values of variants;
      receive values for at least some of the variants;
      compare the received values to the variant values specified by the conditional statements of the configuration file;
      generate, based on the comparing, one or more of the configuration settings; and
      generate a configuration request object, comprising at least some of the generated configuration settings, the generating being performed by mechanisms that were tuned based on the received configuration file, the tuning comprising setting aside a first set of variants having a greater quantity of valid values than others of the variants; and materializing valid values for only the others of the variants;
   wherein at least some of the received variant values are indicative of capabilities of a computing device through which a user accesses a user-facing service;
   wherein at least some of the generated configuration settings define features of a user interface presented to the user by the user-facing service; and
   wherein the generated configuration settings comprise instances of the data structures defined in the schema.

9. The computing device of claim 8, wherein the computer-readable media comprise further computer-executable instructions, which, when executed by the one or more processing units, cause the computing device to: generate object model source code defining objects in accordance with the data structures defined in the schema; wherein computer-executable instructions of the user-facing service comprise dependencies on the generated object model source code.

10. The computing device of claim 8, wherein the computer-readable media comprise further computer-executable instructions, which, when executed by the one or more processing units, cause the computing device to: provide access to the configuration request object to the user-facing service; receive, from the user-facing service parameter requests directed to the configuration request object and provide, in response to the parameter requests, parameter values specified by the configuration request object, the parameter values configuring the user-facing service.

11. The computing device of claim 8, wherein the computer-readable media comprise further computer-executable instructions, which, when executed by the one or more processing units, cause the computing device to: generate a sample configuration file comprising a sample instance of the data structures defined in the schema; and provide the sample configuration file to aid in generating the received configuration file.

12. The computing device of claim 8, wherein the data structures defined in the schema comprise variables of defined types, the computer-readable media comprise further computer-executable instructions, which, when executed by the one or more processing units, cause the computing device to: load the received configuration file prior to the generating the configuration request object, the loading of the received configuration file comprising detecting a setting of values that violates the defined types.

13. The computing device of claim 8, wherein the data structures defined in the schema comprise custom validation instructions, the computer-readable media comprise further computer-executable instructions, which, when executed by the one or more processing units, cause the computing device to: load the received configuration file prior to the generating the configuration request object, the loading of the received configuration file comprising validating a setting of values in accordance with the validation instructions.

14. The computing device of claim 8, wherein the computer-readable media comprise further computer-executable instructions, which, when executed by the one or more processing units, cause the computing device to: tune, based on the received configuration file, mechanisms which perform the generating the configuration request object, the tuning comprising selecting slower mechanisms that consume less memory if faster mechanisms would consume a greater than a threshold amount of memory.

15. A system comprising:
   a first computing device executing computer-executable instructions providing a user-facing serving; and
   a second computing device, executing computer-executable instructions for providing configuration settings for the user-facing serving, the computer-executable instructions, when executed by the second computing device, cause the second computing device to perform steps comprising:
      receiving, from the user-facing service, a schema comprising programmatic definitions of computer-readable data structures;
      receiving, from the user-facing service, a configuration file comprising conditional statements correlating configuration settings to values of variants;
      receiving, from the user-facing service, values for at least some of the variants;
      comparing the received values to the variant values specified by the conditional statements of the configuration file;
      generating, based on the comparing, one or more of the configuration settings; and
      generating a configuration request object, comprising at least some of the generated configuration settings, the generating being performed by mechanisms that were tuned based on the received configuration file, the tuning comprising setting aside a first set of variants having a greater quantity of valid values than others of the variants; and materializing valid values for only the others of the variants;
   wherein at least some of the received variant values are indicative of capabilities of a third computing device through which a user accesses the user-facing service;
   wherein at least some of the generated configuration settings define features of a user interface presented to the user by the user-facing service; and
   wherein the generated configuration settings comprise instances of the data structures defined in the schema.

16. The system of claim 15, wherein the second computing device comprises further computer-executable instructions for: generating object model source code defining objects in accordance with the data structures defined in the schema; and wherein further the computer-executable instructions providing the user-facing service comprise dependencies on the generated object model source code.

17. The system of claim 15, wherein the second computing device comprises further computer-executable instructions for: receiving, from the user-facing service, an updated configuration file comprising a first updated conditional statement that is an updated of a first conditional statement that was specified in the configuration file; and, in response to the receiving the updated configuration file, reloading only those portions of the computer-executable instructions for generating the configuration request object that reference the first conditional statement.

18. The system of claim 15, wherein the second computing device comprises further computer-executable instructions for: tuning, based on the received configuration file, mechanisms which perform the generating the configuration request object, the tuning comprising selecting slower mechanisms that consume less memory if faster mechanisms would consume a greater than a threshold amount of memory.

* * * * *